United States Patent [19]

Saito et al.

[11] 4,360,819
[45] Nov. 23, 1982

[54] THERMAL RECORDING APPARATUS

[75] Inventors: Tamio Saito, Oume; Yoshikatsu Fukumoto, Hamura; Kiyomi Tagaya, Oume, all of Japan

[73] Assignee: Tokyo Shibaura Denki Kabushiki Kaisha, Kawasaki, Japan

[21] Appl. No.: 240,970

[22] Filed: Mar. 5, 1981

[30] Foreign Application Priority Data

Mar. 12, 1980 [JP] Japan .................................. 55-31279

[51] Int. Cl.³ ............................................. G01D 15/10
[52] U.S. Cl. ............................... 346/76 PH; 219/216; 400/120
[58] Field of Search ................... 346/76 PH; 219/216; 400/120

[56] References Cited

U.S. PATENT DOCUMENTS 3,934,695  1/1976  Kovalick ...................... 219/216 X
4,113,391  9/1978  Minowa ....................... 219/216 X
4,168,421  9/1979  Ito ............................. 346/76 PH X

FOREIGN PATENT DOCUMENTS 51-139449  5/1976  Japan .
51-13434   7/1976  Japan .
51-27038   8/1976  Japan .

Primary Examiner—G. Z. Rubinson
Assistant Examiner—W. J. Brady
Attorney, Agent, or Firm—Schuyler, Banner, Birch, McKie & Beckett

[57] ABSTRACT

Disclosed is a thermal recording apparatus comprising: a plurality of aligned thermal resistive elements; a plurality of drive elements, each serially connected to the thermal resistive elements, for driving the thermal resistive elements; a DC power source connected in parallel with the thermal resistive elements and the drive elements and having a smaller current capacity than the necessary current to simultaneously drive all the thermal resistive elements; a capacitor having a large capacitance connected, in parallel, to the DC power source; a detecting means for detecting the voltage across the capacitor and comparing it with a predetermined voltage; and, a limiting means for limiting the number of the thermal resistive elements simultaneously driven when the detected voltage falls below the predetermined voltage.

12 Claims, 5 Drawing Figures

THERMAL RECORDING APPARATUS

BACKGROUND OF THE INVENTION

The invention relates to thermal recording apparatus, and more particularly, to a thermal recording apparatus utilizing a plurality of aligned thermal resistive elements selectively driven according to recording signals.

In the prior art thermal recording apparatus used in facsimile systems a matrix circuit has been used, for example, to decrease the number of drive elements and lead lines connected to the resistive elements. Toshiba has recently introduced one method which eliminates the matrix circuiting by incorporating a shift register; such a method produces higher recording speed. A structure embodying this method is shown in FIG. 1. Serial binary recording signals (picture signals) for one line and received from input 1 are stored in a shift register 2 having memory units corresponding to the number of thermal resistive elements 4. The signals stored in register 2 are read out, in parallel, and supplied to drive elements 3. Drive elements 3 comprise, for example, transistor switching elements and are connected respectively to thermal resistive elements 4. As a result, current is supplied from a DC power source 5 to the thermal resistive elements 4 corresponding to the particular switching elements which are energized by the signals supplied from shift register 2. When binary recording signals are supplied to input terminal 1 and thermal sensitive paper (not shown), contacting the resistive elements 4, is moved with respect to elements 4, a recorded image is thereby obtained on the paper.

In this apparatus, the current cpacity of DC power source 5 is determined by considering the case when all the recording signals for one line are black signals (i.e., printing signals). In that event, the current output of source 5 will be at its maximum level. For example, if recording is executed with a resolution of 8 dot/mm on a thermal sensitive paper (e.g., size A4), the required number of thermal resistive elements which must be employed in 1728. If the voltage of DC power source 5 is 18 volts and the resistance of thermal resistive element 5 is 300Ω, the current flowing through each thermal resistive element is 60 mA. Therefore, when all the recording signals (i.e., 1728 bits) are black signals, the total current output of source 5 becomes 103.68 amperes. Consequently, a DC power source having a large current capcity is necessary.

While the probability that all the recording signals for one line will be black signals is low, it is still necessary to have that capability if the need should arise in order to ensure proper print quality. Using a power source which has a large current capacity, however, results in economic waste with the size of the apparatus being concomitantly increased. One method to solve this problem is disclosed in Japanese patent disclosure No. 53-13434. This system counts the number of black recording signals for one line by utilizing a counter. When the number of black signals is larger than the current capacity of the power source, certain groups of the thermal resistive elements which had been simultaneously driven are de-energized. This technique, however, uses a matrix circuit for supplying recording signals to thyristor elements serially connected to the thermal resistive elements. As a result, the recording speed is reduced. Further, each time the number of black signals is larger than the current capacity, the recording of a line must be executed by sequentially de-energizing certain elements while sequentially energizing different elements. Since switching is needed each time the number of black signals is less than the current capacity, the demand for such sequential switching is frequent; therefore, more demands are placed on the switching circuitry.

SUMMARY OF THE INVENTION

It is one object of this invention to provide a thermal recording apparatus incorporating a power source having a small current capacity.

It is another object of this invention to provide a thermal recording apparatus which can operate without affecting recording speed when the recording signals contain many black signals which occur during a relatively short period of time.

It is yet another object of this invention to provide a thermal recording apparatus which can record without degradation of density when the recording signals contain many black signals which occur during a relatively long period of time.

According to this invention, the foregoing and other objects are attained by providing a thermal recording apparatus comprising: a plurality of aligned thermal resistive elements; a plurality of drive elements, each serially connected to the thermal resistive elements, for driving the thermal resistive elements; a DC power source connected in parallel with the thermal resistive elements and the drive elements and having a smaller current capacity than the necessary current to simultaneously drive all the thermal resistive elements; a capacitor having a large capacitance connected, in parallel, to the DC power source; a detecting means for detecting the voltage across the capacitor and comparing it with a predetermined voltage; and a limiting means for limiting the number of the thermal resistive elements simultaneously driven when the detected voltage falls below the predetermined voltage.

Even if all the thermal resistive elements are simultaneously driven for one or more printing lines, degradation of recording speed and density is precluded according to the invention by incorporating a capacitor having a large capacitance and means for limiting the number of elements simultaneously driven.

BRIEF DESCRIPTION OF THE DRAWINGS

Other objects and features of the invention will become apparent to those skilled in the art in view of the disclosure made in the following description of preferred embodiments of the invention and illustrated in the accompanying sheet of drawings, in which.

DESCRIPTION OF THE PREFERRED EMBODIMENTS

Figure 2:
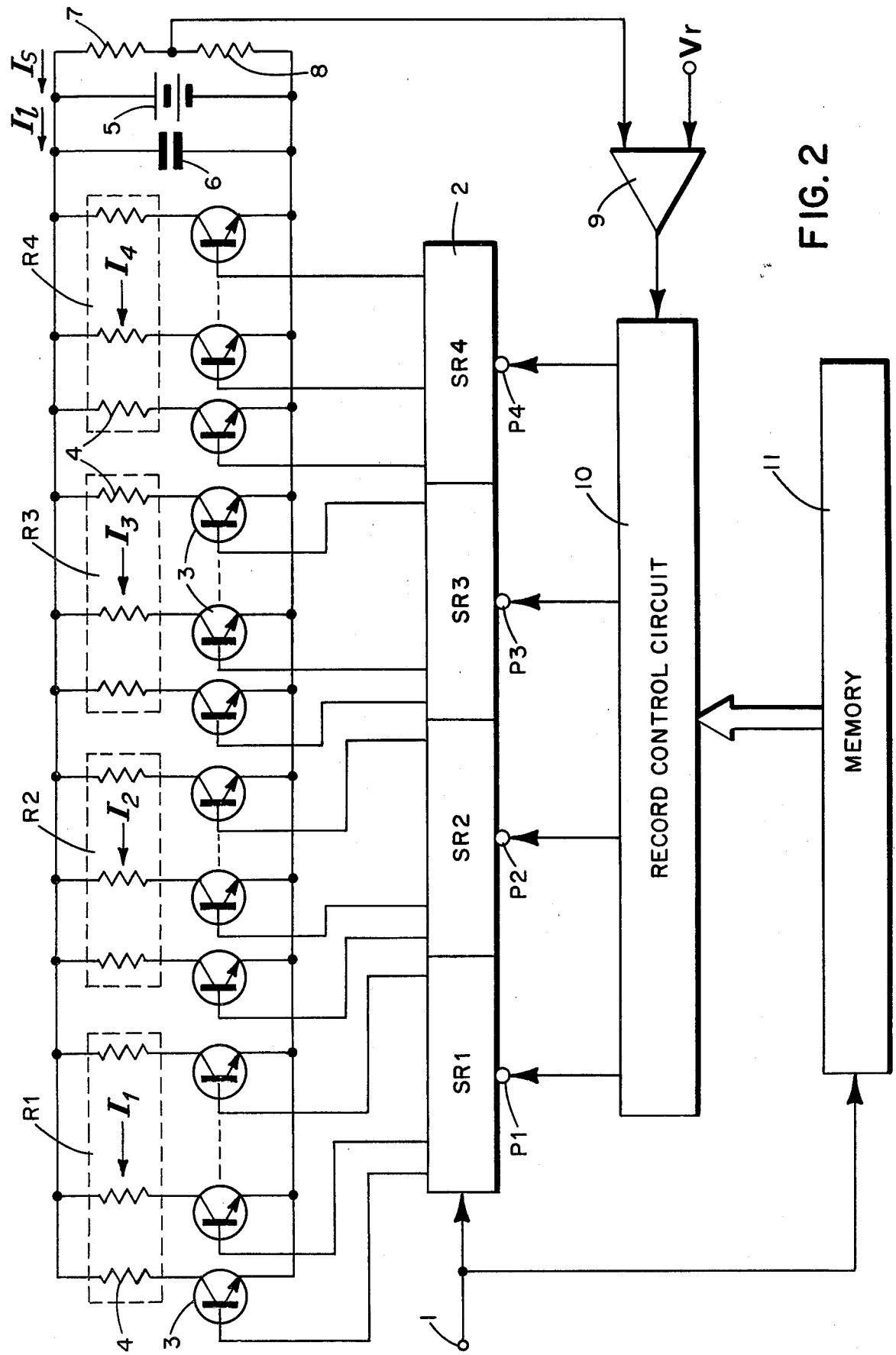
FIG. 2 shows a wiring diagram of one embodiment of this invention.

In the drawing, like reference characters designate identical or corresponding parts throughout the several views. One embodiment of this invention is shown in FIG. 2. A capacitor 6, having a large capacitance, is connected in parallel with a DC power source 5. DC power source 5 has a current capacity smaller than current necessary to simultaneously drive all thermal resistive elements. The elements are placed in, for example, four groups, R1-R4. Two series resistors 7, 8 are connected in parallel with capacitor 6 for detecting the terminal voltage of comparator 6. The voltage detected by these resistors is compared in capacitor 9 with a predetermined reference voltage Vr.

A shift register 2 is divided into four serially connected groups, SR1-SR4 consisting of a plurality of memory units, each group corresponding to a respective element group. When the bit number of recording signals for one line is 1728, the bit number of each group is 432 (i.e., 1728/4). Each of the groups SR1 ... SR4 has a control terminal (i.e., P1 ... P4) which controls the output signals from that group. Namely, when a "1" signals is supplied to certain control terminals, the groups of shift register 2 receiving this signal will output the signals stored within these groups to drive elements 3. On the other hand, when an "0" signal is supplied to certain output control terminals, the group receiving this signal will be prevented from activating the drive elements serially connected thereto.

The control signals are supplied from a record control circuit 10. Generally, record control circuit 10 supplies a "1" control signal to all the output control terminals; consequently, all groups are activated to permit the elements 4 to be driven by the appropriate recording signals. When, however, the terminal voltage of capacitor 6 falls below reference voltage Vr, a signal is supplied from comparator 9 to control circuit 10 to change the state of one or more of the control signals supplied to terminals P1-P4. Record control circuit 10 outputs "0" control signals to certain ones of the output control terminals P1 ... P4 according to the number of black recording signals stored in each section of memory 11, as will be explained later.

The current capacity Io of DC power source 5 is selected so that it is smaller than current Ia (e.g., Ia=103.68 A) necessary to simultaneously drive all elements 4. The capacity, however, is determined so that it is larger than the current (e.g., 432×60 mA=25.92 A) necessary to simultaneously drive the resistive elements of one group.

The capacitance of capacitor 6 is selected so that degradation of density at several lines is prevented even assuming the total current flowing through all the resistive elements is temporarily greater than the current capacity $I_o$. Assume, for example, the width of the resistive signal pulse flowing through elements 4 is 1 msec, the duty cycle of the resistive signal pulses is 50%, the current capacity $I_o$ is 26 A, and the simultaneous driving current Ia is 104 A. Then, if a permissible voltage change ΔV of the terminal voltage V of capacitor 6 is 0.6 volts (i.e., the voltage change that can be tolerated without degrading recording density), $$\Delta \overline{V} = -0.6 = \frac{-104 \times 1 \times 10^{-3}}{C} \times 3 +$$

$$\frac{26 \times 1 \times 10^{-3}}{C} \times 5 \therefore C \approx 0.304$$

the capacitance C of capacitor 6 is selected to be about 0.304 farads. If the duty cycle of the recording signal pulse is 75%, $$\Delta \overline{V} = -0.6 = \frac{-104 \times 1 \times 10^{-3}}{C} \times 3 +$$

$$\frac{26 \times 1 \times 10^{-3}}{C} \times 3.66 \therefore C \approx 0.361$$

the capacitance C becomes about 0.361 farads. An electrolytic capacitor of electric double layer type is the preferable type capacitor due to its compactness, practicality, and large capacitance values.

Figure 1:
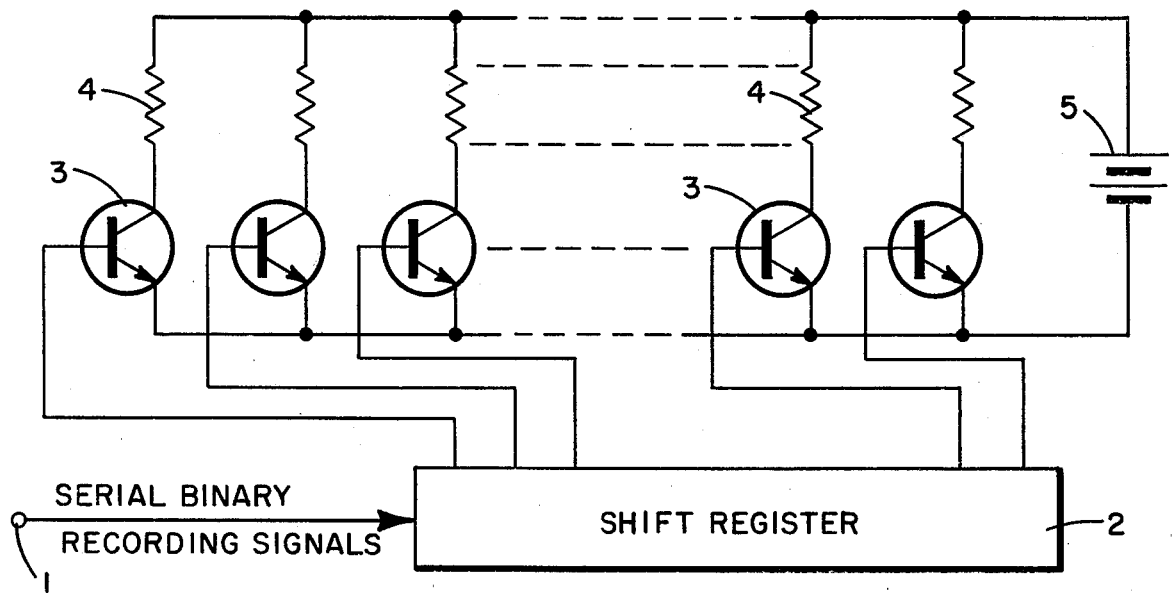
FIG. 1 shows a fundamental wiring diagram of a thermal recording apparatus.
Figure 3:
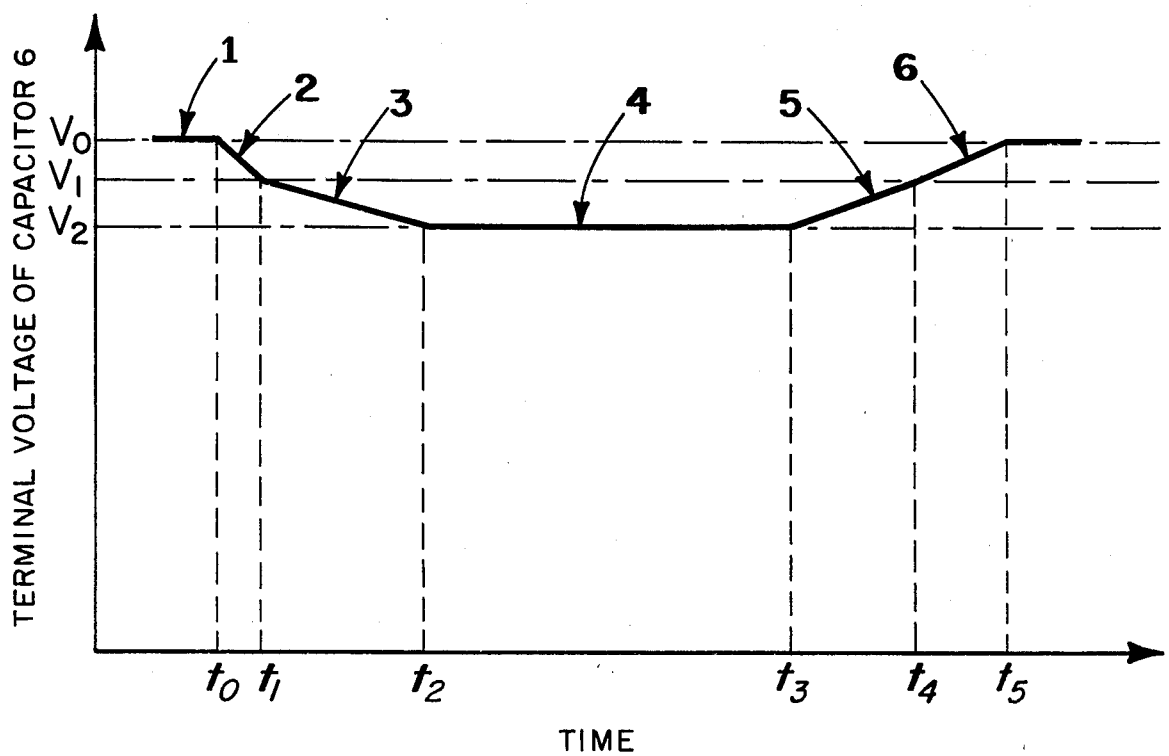
FIG. 3 shows the change of terminal voltage of capacitor 6 incorporated in the circuit of FIG. 2.

The operation of the above embodiment will be explained with reference to FIG. 3. FIG. 3 shows an example of the change of the terminal voltage of capacitor 6 versus time. Vo is the controllable maximum voltage of DC power source 5 and initial voltage. V1 is the controllable minimum voltage of DC power source 5 and V2 is the minimum voltage necessary for recording. $I_s$ (see FIG. 2) is the current output of source 5 and $I_1$ is the current flowing in the branch of the circuit containing resistive elements 4. $I_1$ has a value $I_{11}$ when all the resistive elements in one group are activated and all the other groups are simultaneously deactivated. $I_1$ has a value $I_{11}$ when some but not all of the resistive elements in a group is activated and all the other groups are deactivated. When $I_1$ has the value $I_{11}$, $I_1 \approx I_o$; when $I_1$ has the value $I_{11}$, $I_1 < I_o$.

When all the drive elements 3 in all groups are on (i.e., time to) the value for $I_1$ is Ia. This is shown in FIG. 3 as state ① when the terminal voltage V is $V_o$. Afterwards, the terminal voltage V of capacitor 6 gradually declines as shown in state ② (FIG. 3). When V reaches voltage level V1 (i.e., time t1), the power source 5 supplies current $I_s$ which equals $I_o$ Between time t1 and t2, however, the terminal voltage V of capacitor 6 gradually declines since Ia Io as shown in state ③ (FIG. 3). As can be seen from FIG. 3, during state ③, the slope of the voltage change is less than state ② since, at this time, current $I_s$ also contributes to the current flowing into the resistive element branch. During state ③, the resistive elements are simultaneously driven, however, degradation of density is not produced since V≧V2.

At time t2 when terminal voltage V equals V2, comparator 9 supplies an output signal to control circuit 10. As a result, record control circuit 10 supplies output control signals having a "0" value to certain output control terminals and a "1" value to other terminals according to the number of black signals stored in each section of memory 11 for one line. That is, control circuit 10 calculates the total current flowing within each respective group (e.g., $I_1 ... I_4$) of resistive elements 4 from the pattern of recording signals stored in memory 11. For example, if memory 11 contains four black recording signals in the memory section corresponding to group one of resistive elements, then the total current $I_1$ in group one will equal 4 $V_2/R_s$ where R is the resistance of each resistive element. Then, record control circuit 10 first calculates $I_3+I_4$ and compares it with $I_o$. If $I_3+I_4>I_o$, then a "1" signal is supplied only to output control terminal P4 during a predetermined time. During this predetermined time, the other output terminals are supplied with a "0" signal. Immediately after this predetermined time, circuit 10 then calculates $I_2+I_3$ and compares it with $I_o$. If $I_2+I_3>I_o$, a "1" signal is then supplied only to output control terminal P3 during a second predetermined time. During this second predetermined time, the other output terminals are supplied with an "0" signal. Immediately after this second predetermined time, circuit 10 then calculates $I_1+I_2$ and compares it with $I_o$. If $I_1+I_2>I_o$, a "1" is then sequentially supplied to control terminals P2 and P1 during a third and fourth predetermined time. During this third predetermined time, the other output terminals are supplied with a "0" signal.

In the above example, each group of the four groups of thermal resistive elements are activated in sequence. On the other hand, if the added current value for two groups is smaller than current capacity $I_o$, a "1" signal is supplied into the two respective terminals at the same time. For example, if $I_1+I_2<I_o$, a "1" signal is simultaneously supplied to control terminals P1 and P2. That is, the two groups R1 and R2 of thermal resistive elements 4 are simultaneously driven. As stated above, as long as each line has many black signals during state ④ (i.e., V=V2), the four groups SR1-SR4 are activated according to the number of black signals stored in each section of memory 11.

If the recording signals for one line subsequently have a smaller number of black signals (i.e., $I_1=I_{11}<I_o$), for example at time t3, control circuit 10 simultaneously supplies "1" signals to all the control terminals P1 . . . P4 so that all groups of thermal resistive elements 4 can be driven by the appropriate recording signals. Subsequently, the terminal voltage V of capacitor 6 will gradually rise during state ⑤ (FIG. 3) and will reach V1 at time t4. The terminal voltage V of capacitor 6 will gradually continue to rise during state ⑥ (FIG. 3) and will reach Vo at a time t5. The following summary table shows the terminal voltage V, Is, and $I_1$ between times t0–t5.

| t | V | $I_s$ | $I_1$ |
|---|---|---|---|
| ② t0–t1 | $\int V_0 - \dfrac{I_a dt}{C}$ | 0 | $= I_a$ |
| ③ t1–t2 | $\int V_1 - \dfrac{(I_a - I_o)dt}{C}$ | $I_o$ | $= I_a > I_o$ |
| ④ t2–t3 | $\int V_2 - \dfrac{(I_{ll} - I_o)dt}{C}$ | $I_o$ | $= I_{ll} \approx I_o$ |
| ⑤ t3–t4 | $\int V_2 - \dfrac{(I_{l1} - I_o)dt}{C}$ | $I_o$ | $= I_{l1} < I_o$ |
| ⑥ t4–t5 | $\int V_1 - \dfrac{(I_{l1} - I_o)dt}{C}$ | $I_o$ | $= I_{l1} < I_o$ |

In the above mentioned embodiment of this invention, all of the resistive elements 4 are permitted to be simultaneously driven during states 3 and 5 due to the presence of capacitor 6. Therefore, high speed recording can be obtained. When recording signals have many black signals continuing during a long period of time and the terminal voltage V tends to fall below V2, simultaneously activation of resistive elements 4 is precluded, thereby restoring terminal voltage V to a value equal to V2. As a result, degradation of density is prevented.

In a further embodiment shown in FIG. 4, memory 11 can be deleted in that case, when the terminal voltage falls below V2 and comparator 9 supplies a signal to record control circuit 10, circuit 10 will supply a "1" signal in sequence to output control terminals P4, P3, P2, and P1. During each time period when a "1" signal is supplied to a signal terminal, the other terminals are supplied with an "0" signal. The resistive elements 4 are divided into several groups (e.g., four groups - R1 . . . R4) and connected to switching elements (e.g., transistors S1 . . . S4). Activation of switching element S4 by control circuit 10 (i.e., "1" signal) while deactivating switching elements S1–S3 (i.e., "0" signal) permits operation only of the resistor elements in group four by appropriate recording signals. Subsequently, S3 is activated while S1–S2 and S4 are deactivated. Thereafter, S2 is activated while S1 and S3–S4 are deactivated, and finally S1 is activated while S2–S4 is deactivated.

Figure 4:
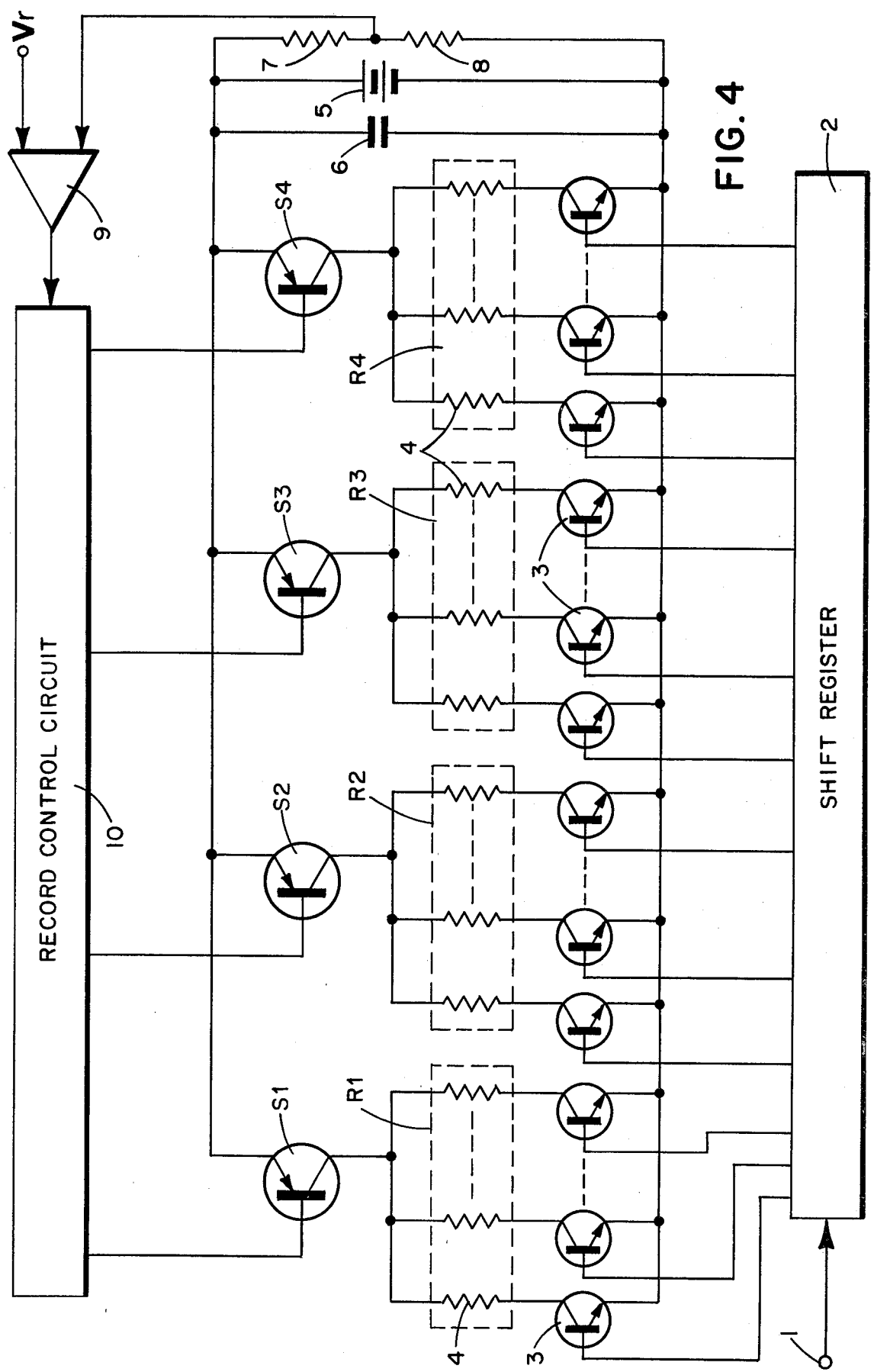
FIG. 4 shows a wiring diagram of another embodiment of this invention.
Figure 5:
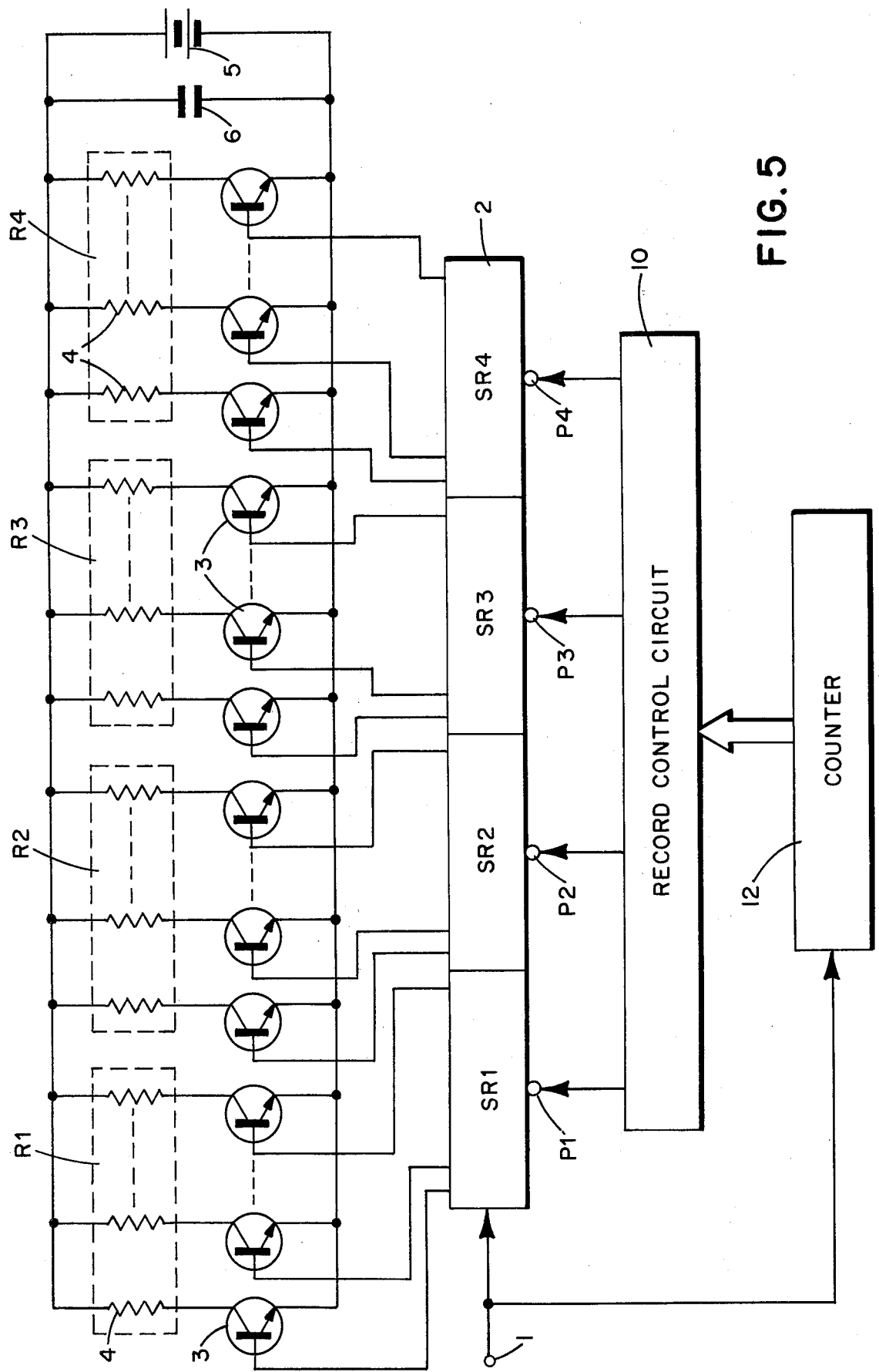
FIG. 5 shows a wiring diagram of a further embodiment of this invention.

In the embodiments of FIGS. 4 and 2, the decrease of terminal voltage V of capacitor 6 is directly detected by resistors 7 and 8. It is possible, however, to indirectly detect the voltage decrease. For example, as shown in FIG. 5, the decrease in voltage can indirectly be detected by using a counter 12 which counts the number of black recording signals. Counter 12 counts the number of black recording signals which occured during the previous recording of a predetermined number of lines. When counter 12 exceeds a predetermined number, record control circuit 10 supplies a "1" signal in sequence to output control terminals P4, P3, P2 and P1 in the manner discussed above regarding FIG. 4.

We claim:

1. A thermal recording apparatus for recording information in accordance with input recording signals comprising:
   a plurality of aligned thermal resistive elements;
   a plurality of drive means, each serially connected to a respective one of said thermal resistive elements, for driving said thermal resistive elements;
   a DC power source connected in parallel to said thermal resistive elements and said drive means, said source having a smaller current capacity than the necessary current to simultaneously drive said thermal resistive elements;
   a capacitor connected in parallel with said source;
   a detecting means for detecting the voltage across said capacitor and comparing it with a predetermined voltage; and,
   a limiting means for limiting the number of the thermal resistive elements simultaneously driven when said detected voltage is less than said predetermined voltage.

2. The thermal recording apparatus of claim 1, wherein said thermal resistive elements are arranged in a plurality of discrete groups and said limiting means selectively drives one or more of said groups when said detected voltage is less than the predetermined voltage.

3. The thermal recording apparatus of claim 2, further comprising switching means, coupled to said drive means and activated by said limiting means, for switching said drive means according to said recording signals.

4. The thermal recording apparatus of claim 3 wherein said switching means is a shift register divided into four serially connected groups, each connected group corresponding to a respective resistive element group.

5. The thermal recording apparatus of claims 3, wherein said limiting means is connected into sections, each limiting section corresponding to a respective switching group and capable of limiting the switching operation of said respective switching group.

6. A thermal recording apparatus according to claim 1, wherein said capacitor is an electrolytic capacitor of an electric double layer type construction.

7. A thermal recording apparatus according to claim 1, wherein said detecting means comprises two serially connected resistors in parallel with said capacitor; and a comparator means, coupled to said resistors, for comparing a voltage at a connecting point between said resistors with said predetermined voltage.

8. A thermal recording apparatus for recording information along several recording lines in accordance with input recording signals which comprise black signals, said apparatus comprising:
- a plurality of aligned thermal resistive elements;
- a plurality of drive means each serially connected to a respective one of said thermal resistive elements for driving said resistive elements;
- a DC power source connected in parallel to said resistive elements and said drive means, said source having a smaller current capacity than the necessary current to simultaneously drive said resistive elements;
- a capacitor connected in parallel with said source;
- a detecting means for indirectly sensing the voltage across said capacitor by detecting the number of black signals which occur during a predetermined number of recording lines; and
- limiting means, coupled to said detecting means, for limiting the number of resistive elements simultaneously driven when said number of black signals exceeds a predetermined count, the predetermined count corresponding to a predetermined voltage of said capacitor.

9. The thermal recording apparatus of claim 8 wherein said detecting means comprises a counter.

10. A thermal recording apparatus for recording information in accordance with input recording signals comprising black signals, said apparatus comprising:
- a plurality of aligned thermal resistive elements;
- a plurality of drive means, each serially connected to a respective one said resistive elements, for driving said resistive elements;
- a shift register, coupled to each of said drive means, having a plurality of memory units, each unit corresponding to a respective drive means for supplying said input recording signals to said drive means;
- a DC power source connected in parallel to said thermal resistive elements and said drive means, said source having a smaller current capacity than the necessary current to simultaneously drive said resistive elements;
- a capacitor connected in parallel, with said DC power source;
- a resistor means connected in parallel with said capacitor for detecting a terminal voltage of said capacitor;
- a comparator means coupled to said resistor means for comparing the detected terminal voltage with a predetermined voltage; and,
- a control means for controlling the supply of said recording signals from the memory units to the drive means when the detected terminal voltage is less than said predetermined voltage.

11. A thermal recording apparatus according to claim 10, wherein said control means comprises a memory for storing the recording signals for one line and a circuit for controlling the supply of the recording signals from the shift register memory units to said drive means, according to said number of black signals stored in said memory when the detected terminal voltage is less than the predetermined voltage.

12. A thermal recording apparatus according to claim 10, wherein said capacitor is an electrolytic capacitor of electric double layer type construction.

* * * * *